US009013985B2

(12) United States Patent
Sivabalan et al.

(10) Patent No.: US 9,013,985 B2
(45) Date of Patent: Apr. 21, 2015

(54) PROTECTION OF A BIDIRECTIONAL LABEL SWITCHED PATH

(71) Applicants: Muthurajah Sivabalan, Kanata (CA); Sami Boutros, San Ramon, CA (US); George Leonard Swallow, Boston, MA (US); Show Chung Chin, Fairfield, CA (US)

(72) Inventors: Muthurajah Sivabalan, Kanata (CA); Sami Boutros, San Ramon, CA (US); George Leonard Swallow, Boston, MA (US); Show Chung Chin, Fairfield, CA (US)

(73) Assignee: Cisco Technology, Inc., San Jose, CA (US)

( * ) Notice: Subject to any disclaimer, the term of this patent is extended or adjusted under 35 U.S.C. 154(b) by 158 days.

(21) Appl. No.: 13/655,937

(22) Filed: Oct. 19, 2012

(65) Prior Publication Data

US 2014/0112124 A1    Apr. 24, 2014

(51) Int. Cl.
*H04L 12/24*    (2006.01)
*H04L 12/707*    (2013.01)
*H04L 12/703*    (2013.01)
*H04L 12/723*    (2013.01)
*H04L 12/911*    (2013.01)

(52) U.S. Cl.
CPC .............. *H04L 45/22* (2013.01); *H04L 45/28* (2013.01); *H04L 45/50* (2013.01); *H04L 47/825* (2013.01)

(58) Field of Classification Search
CPC ......... H04L 45/22; H04L 45/50; H04L 45/28; H04L 47/825
USPC ......... 370/228, 392, 389, 229, 254, 248, 401, 370/242
See application file for complete search history.

(56) References Cited

U.S. PATENT DOCUMENTS

| 7,012,887 | B2* | 3/2006 | Zhu et al. ..................... 370/216 |
| 7,012,919 | B1* | 3/2006 | So et al. ........................ 370/392 |
| 7,061,921 | B1* | 6/2006 | Sheth ....................... 370/395.52 |
| 7,486,615 | B2* | 2/2009 | Andersson et al. .......... 370/225 |
| 7,561,527 | B1  | 7/2009 | Katz et al. |
| 7,660,256 | B2* | 2/2010 | Nagami et al. ............... 370/241 |
| 7,944,817 | B1* | 5/2011 | Sylvain ........................ 370/228 |
| 8,139,479 | B1* | 3/2012 | Raszuk ........................ 370/228 |
| 8,144,601 | B2* | 3/2012 | Liu ............................ 370/241.1 |

(Continued)

OTHER PUBLICATIONS

Zhang et al, "RSVP-TE Extensions for Associated Bidirectional LSPs," draft-ietf-ccamp-mpls-tp-rsvpte-ext-associated-lsp-05, Sep. 13, 2012, The Internet Society, Reston, VA, USA (fifteen pages).

(Continued)

*Primary Examiner* — Rasheed Gidado
(74) *Attorney, Agent, or Firm* — The Law Office of Kirk D. Williams

(57) ABSTRACT

In one embodiment, a primary bidirectional LSP is established between an originating LSP packet switching device and a destination LSP packet switching device through an intermediate packet switching device. A corresponding backup LSP is also established. The originating LSP packet switching device sends a particular label switched packet to the destination LSP packet switching device over the primary bidirectional LSP. An intermediate packet switching device sends the particular label switched packet back to the originating LSP packet switching device over the primary bidirectional LSP in response to an error condition identified as affecting the primary bidirectional LSP towards the destination LSP packet switching device. The originating LSP packet switching device receives the particular label switched packet and sends it to the destination packet switching device over the backup LSP.

20 Claims, 7 Drawing Sheets

(56) References Cited

U.S. PATENT DOCUMENTS

| | | | |
|---|---|---|---|
| 8,305,882 B2 * | 11/2012 | Hassink et al. | 370/225 |
| 8,406,243 B2 * | 3/2013 | Kini et al. | 370/409 |
| 8,693,339 B2 * | 4/2014 | So | 370/237 |
| 2007/0207591 A1 | 9/2007 | Rahman et al. | |
| 2011/0141891 A1 * | 6/2011 | So | 370/235 |
| 2011/0242988 A1 * | 10/2011 | Rustogi et al. | 370/242 |
| 2012/0163190 A1 * | 6/2012 | Jocha et al. | 370/241.1 |
| 2012/0281541 A1 | 11/2012 | Palmer et al. | |

OTHER PUBLICATIONS

"Understanding MPLS-TP and Its Benefits," 2009, Cisco Systems, Inc., San Jose, CA, USA (six pages).

* cited by examiner

PROTECTION OF A BIDIRECTIONAL LABEL SWITCHED PATH

TECHNICAL FIELD

The present disclosure relates generally to forwarding packets in a communications network, that includes a bidirectional label switched path.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Reliably communicating information in a network is important. When the topology of the network changes, such as when a path over which certain packets are forwarded becomes unavailable or a new path is added to the network, corrective action is required.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1A:
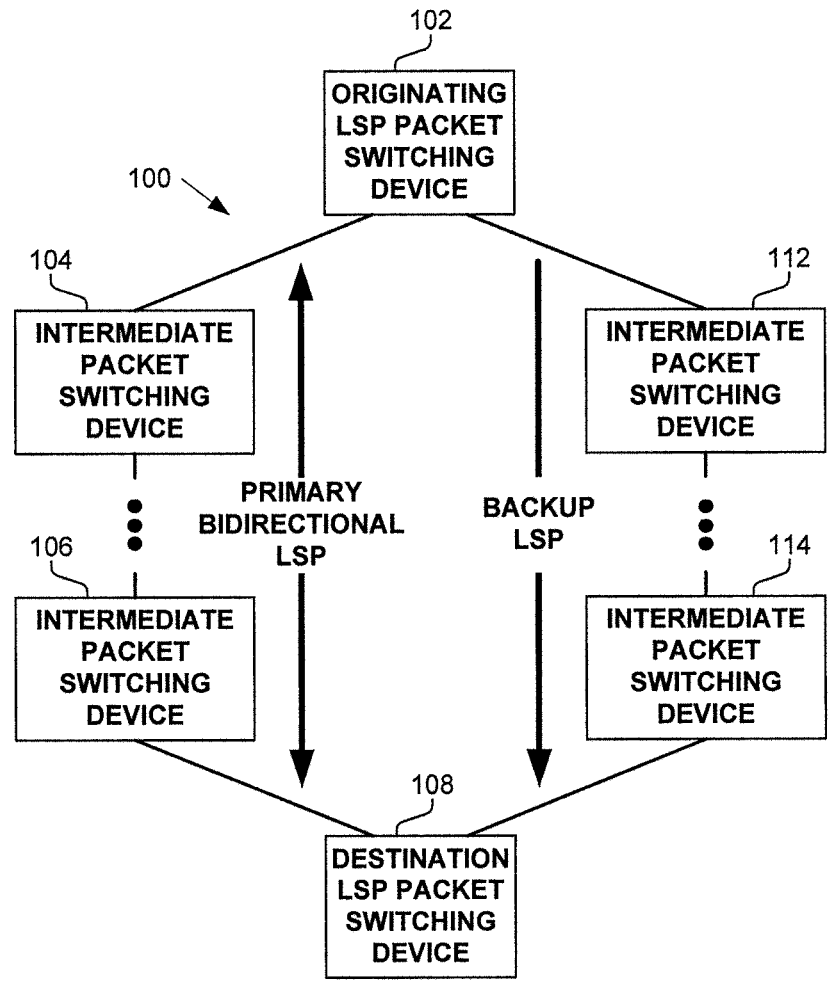
FIG. 1A illustrates a network according to one embodiment.

Disclosed are, inter alia, methods, apparatus, computer-storage media, mechanisms, and means associated with providing protection of a bidirectional label switched path (LSP). In one embodiment, a primary bidirectional LSP is established between an originating LSP packet switching device and a destination LSP packet switching device through an intermediate packet switching device. A backup LSP is also established between the originating and destination LSP packet switching devices. The originating LSP packet switching device sends a particular label switched packet to the destination LSP packet switching device over a primary bidirectional LSP. The intermediate packet switching device sends the particular label switched packet back to the originating LSP packet switching device over the primary bidirectional LSP in response to an error condition identified as affecting the primary bidirectional LSP towards the destination LSP packet switching device. (Without the error condition, the intermediate packet switching device would typically forward the particular label switched packet back over the primary bidirectional LSP to the destination LSP packet switching device.) The originating LSP packet switching device receives the particular label switched packet and sends it to the destination packet switching device over the backup LSP.

In one embodiment, the primary bidirectional label switched path is a Multiprotocol Label Switching Transport Protocol (MPLS-TP) bidirectional LSP. In one embodiment, the backup LSP is a second MPLS-TP bidirectional LSP. In one embodiment, both directions of the primary bidirectional LSP are routed through a same plurality of intermediate packet switching devices, including the intermediate packet switching device.

In one embodiment, the label stack of the particular label switched packet said received by the originating LSP packet switching device includes a Generic Alert Label (GAL) and a Generic Associated Channel (G-ACh) identifying to send the particular label switched packet over the backup LSP after having been initially sent by the originating LSP packet switching device. In one embodiment, the label stack includes, between the GAL and the G-ACh, one or more labels copied from the particular label switched packet said received by the intermediate packet switching device. In one embodiment, the label stack includes a pseudowire (PW) label interposed between the GAL and the G-ACh.

In one embodiment, the label stack of the particular label switched packet said received by the originating LSP packet switching device includes a reserved label identifying to send the particular label switched packet over the backup LSP after having been initially sent by the originating LSP packet switching device. In one embodiment, the label stack includes, after the reserved label, one or more labels copied from the particular label switched packet said received by the intermediate packet switching device. In one embodiment, the reserved label is a value in the Multiprotocol Label Switching (MPLS) reserve label space.

In one embodiment, the label stack of the particular label switched packet said received by the originating LSP packet switching device includes a label identifying the backup LSP. In one embodiment, the label stack includes, after the label identifying the backup LSP, one or more labels copied from the particular label switched packet said received by the intermediate packet switching device.

2. Description

Disclosed are, inter alia, methods, apparatus, computer-storage media, mechanisms, and means associated with providing protection of a bidirectional label switched path (LSP).

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope and spirit of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. The term "particular machine," when recited in a method claim for performing steps, refers to a particular machine within the 35 USC §101 machine statutory class. Finally, a reference to "a packet" and subsequently to reference to "the packet" are both referencing a same packet (e.g., an exact copy or derivation thereof) even if the label stack, header, and/or other fields of the packet are modified by packet processing and/or forwarding through the network and/or within a packet switching device, etc.

Expressly turning to the figures, FIG. 1A illustrates network 100 according to one embodiment. As shown, network 100 includes packet switching devices 102-114 communicatively coupled as shown. Between originating LSP packet switching device 102 and destination LSP packet switching device 108 are established a primary bidirectional LSP through intermediate packet switching devices 104-106, and a backup LSP (which may be one path of a bidirectional LSP) through intermediate packet switching devices 112-114. Note, the terms "originating" and "destination" are used to denote the operation for particular packets. In one embodiment, originating LSP packet switching device 102 is also a "destination" LSP packet switching device for packets sent to it from destination LSP packet switching device 108 operating as "originating" for those packets.

In one embodiment, the primary bidirectional label switched path is a Multiprotocol Label Switching Transport Protocol (MPLS-TP) bidirectional LSP. In one embodiment, the backup LSP is a second MPLS-TP bidirectional LSP. In one embodiment, both directions of the primary bidirectional LSP are routed through a same plurality of intermediate packet switching devices, including the intermediate packet switching device.

Figure 1B:
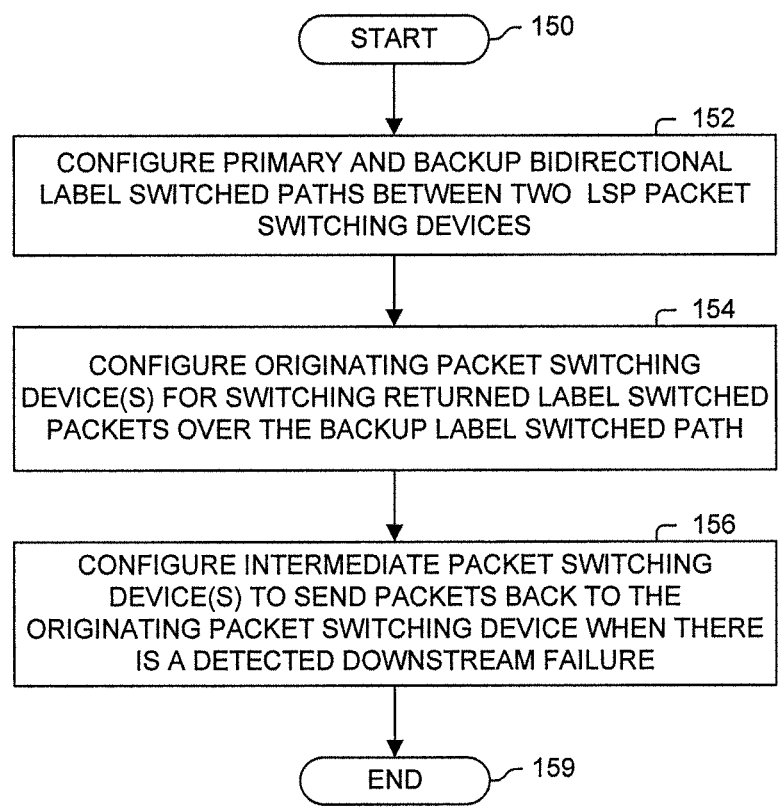
FIG. 1B illustrates a process according to one embodiment.

FIG. 1B illustrates an initialization process performed in one embodiment. In one embodiment, signaling is performed between devices using a signaling protocol, such as, but not limited to, using Resource Reservation Protocol (RSVP). In one embodiment, a network management system is used. In one embodiment, configuration via a craft or other terminal is performed by an operator.

Processing begins with process block 150. In process block 152, primary and backup bidirectional LSPs are established between two packet switching devices. In process block 154, each of the packet switching devices that will be acting as an "originating" LSP packet switching device is configured for sending over the backup LSP any received label switched packets that it initially sent over the primary bidirectional LSP and were returned by an intermediate packet switching device in response to an error condition in the LSP (of primary bidirectional LSP) from the originating to the destination LSP packet switching device.

In process block 156, each of the intermediate packet switching device(s) through which the primary bidirectional LSP traverses is programmed to send packets back to the originating packet switching device in response to an identified error in the primary bidirectional LSP downstream from the intermediate LSP packet switching device towards the destination LSP packet switching device. In one embodiment, the error condition prevents packets from being carried over at least one direction of the primary bidirectional LSP. In one embodiment, the error condition is a layer-1 or layer-2 error (e.g., loss of signal or connection with a neighboring packet switching device), which may detect an error in said at least one direction of the primary bidirectional LSP prior to the detection by a layer-3 or higher protocol (e.g., Bidirectional Forwarding Detection). In one embodiment, the error condition is a layer-3 or higher error.

In one embodiment, the intermediate LSP packet switching device reversing the direction of the label switched packet modifies the label stack of a return label switched packet to include a Generic Alert Label (GAL) and a Generic Associated Channel (G-ACh) to notify the originating LSP packet switching device to send the label switched packet over the backup LSP. In one embodiment, one or more identifying labels are copied from the received label switched packet into the label stack of the returned label switched packet between the GAL and the G-ACh.

In one embodiment, the intermediate LSP packet switching device reversing the direction of the label switched packet modifies the label stack of the label switched packet to include a reserved label to notify the originating LSP packet switching device to send the label switched packet over the backup LSP. In one embodiment, the reserved label is a value in the Multiprotocol Label Switching (MPLS) reserve label space. In one embodiment, one or more identifying labels are copied from the received label switched packet into the label stack of the returned label switched packet after the reserved label.

In one embodiment, the intermediate LSP packet switching device reversing the direction of the label switched packet modifies the label stack of the label switched packet to include a label identifying the backup LSP (determined by originating LSP packet switching device in process block 154, and configured by the intermediate LSP packet switching device in process block 156), so that the originating LSP packet switching device can directly label switch the packet onto the backup LSP. In one embodiment, one or more identifying labels are copied from the received label switched packet into the label stack of the returned label switched packet after the one or more labels identifying the backup LSP.

In one embodiment, these one or more identifying labels are the labels remaining in the label stack of the received label switched packet after popping a transport label from the top of the label stack. These one or more identifying labels are maintained such that a destination LSP packet switching device can interpret correctly the information contained in the packet. For example, in one embodiment, these one or more labels includes a pseudowire (PW) label.

Figure 2A:
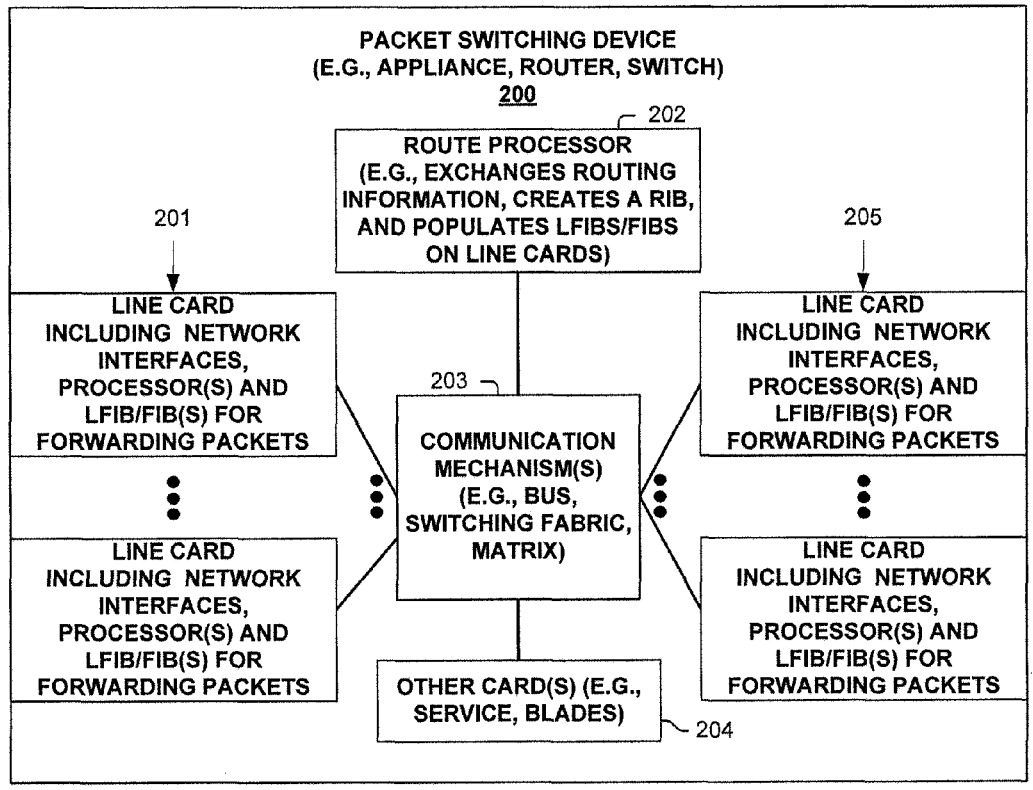
FIG. 2A illustrates a packet switching device according to one embodiment.

One embodiment of a packet switching device 200 is illustrated in FIG. 2A. As shown, packet switching device 200 includes multiple line cards 201 and 205, each with one or more network interfaces for sending and receiving packets over communications links (e.g., including of LSPs and bidirectional LSPs), and with one or more processing elements, and forwarding information typically stored in a label forwarding information base (LFIB) and/or other FIB (e.g., for Internet Protocol packets), that are used in one embodiment associated with providing protection of a bidirectional label switched path (LSP). Packet switching device 200 also has a control plane with one or more processing elements 202 for managing the control plane and/or control plane processing of packets associated with providing protection of a bidirectional label switched path (LSP). Packet switching device 200 also includes other cards 204 (e.g., service cards, blades) which include processing elements that are used in one embodiment to process packets associated with providing protection of a bidirectional label switched path (LSP), and some communication mechanism 203 (e.g., bus, switching fabric, matrix) for allowing its different entities 201, 202, 204 and 205 to communicate. Line cards 201 and 205 typically perform the actions of being both an ingress and egress line card, in regards to multiple other particular packets and/or packet streams being received by, or sent from, packet switching device 200.

Figure 2B:
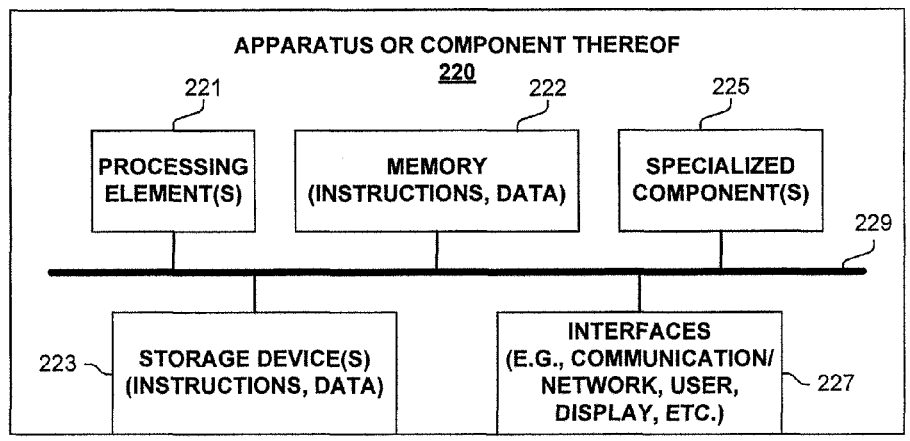
FIG. 2B illustrates an apparatus according to one embodiment.

FIG. 2B is a block diagram of an apparatus 220 used in one embodiment associated with providing protection of a bidirectional label switched path (LSP). In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processing element(s) 221, memory 222, storage device(s) 223, specialized component(s) 225 (e.g. optimized hardware such as for performing lookup and/or packet processing operations, etc.), and interface(s) 227 for communicating information (e.g., sending and receiving packets such as over LSPs, user-interfaces, displaying information, etc.), which are typically communicatively coupled via one or more communications mechanisms 229, with the communications paths typically tailored to meet the needs of a particular application.

Various embodiments of apparatus 220 may include more or fewer elements. The operation of apparatus 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processing element(s) 221 and/or data which is manipulated by processing element(s) 221 for implementing functionality in accordance with an embodiment.

Figure 3:
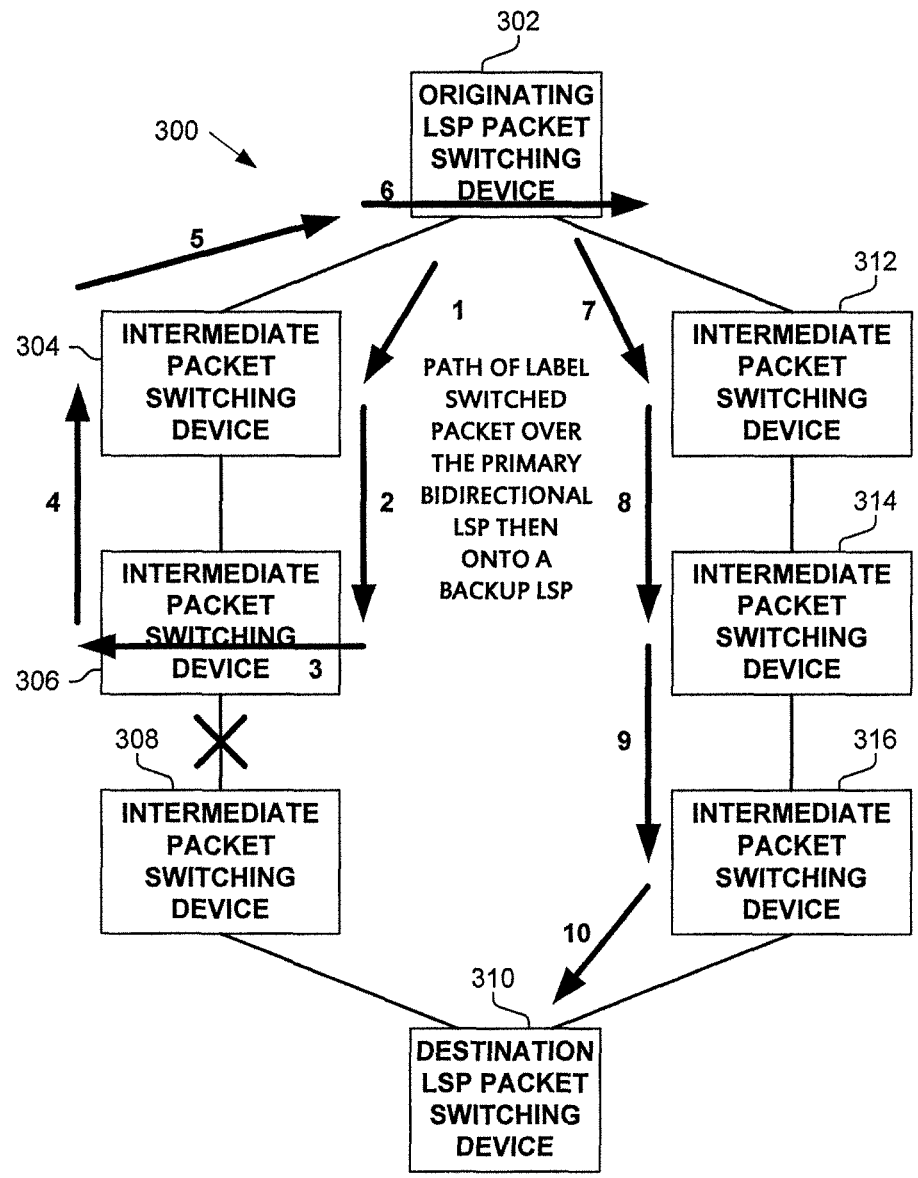
FIG. 3 illustrates a network operating according to one embodiment.

FIG. 3 illustrates a network 300 operating according to one embodiment. Originating LSP packet switching device 302 initiates the sending of a label switched packet over a primary bidirectional LSP to destination LSP packet switching device. Intermediate packet switching device 306 has detected an error condition associated with the segment of the bidirectional LSP between packet switching devices 306 and 308 (at least the LSP of the bidirectional LSP for sending packets towards destination LSP packet switching device 310).

The taken path of this label switched packet is from originating LSP packet switching device 302 to intermediate packet switching device 304 to intermediate packet switching device 306. In response to the detected error condition, intermediate packet switching device 306 sends the packet (after adjusting its label stack, such as, but not limited to, as described herein) over the LSP of the bidirectional LSP towards intermediate packet switching device 304, which forwards it back to originating LSP packet switching device 302. Originating LSP packet switching device 302 receives the label switch packet (it originally sent over the primary bidirectional LSP), and sends it on the backup LSP through intermediate LSP packet switching devices 312, 314, and 316 to destination LSP packet switching device 310.

Figure 4A:
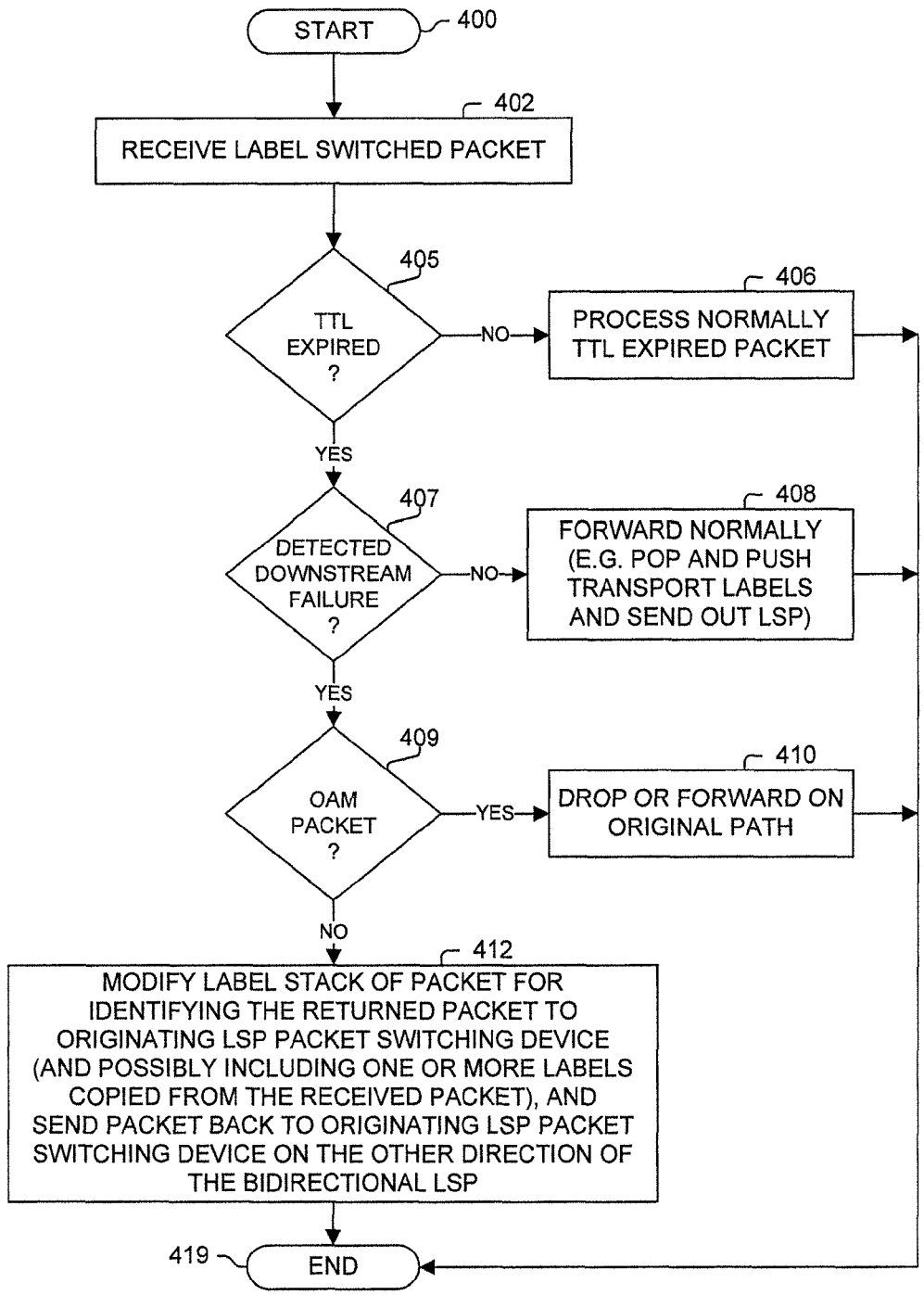
FIG. 4A illustrates a process according to one embodiment.

FIG. 4A illustrates a process performed by an intermediate LSP packet switching device of one embodiment. Processing begins with process block 400. In process block 402, a label switched packet is received. As determined in process block 405, if the time-to-live (TTL) value of the label switched packet has expired, then in process block 406, normally processing of a label switched packet with an expired TTL is performed. Processing proceeds to process block 419.

Otherwise, as determined in process block 407, if no downstream error has been detected, then in process block 408, the label switched packet is forwarded normally (e.g., after adjusting its label stack). Processing then proceeds to process block 419. Otherwise, as determined in process block 407, in response to a detected downstream failure (e.g., affecting forwarding of label switched packets at least on the LSP of the bidirectional LSP in the direction towards the destination LSP packet switching device), then processing proceeds to process block 409. As determined in process block 409, if the packet is an Operations, Administration, and Maintenance (OAM) packet, then in process block 410, the received label switched packet is dropped or forwarded on the original path (e.g., after its label stack adjusted), and/or otherwise processed. Processing then proceeds to process block 419.

Otherwise, the received label switched packet was determined in process block 409 not to be an OAM packet, then in process block 412, the label stack of the label switched packet is modified to send back to, as well as identify that it is a protection-returned label switched packet to, the originating LSP packet switching device. In one embodiment, one or more labels are copied from the label stack of the received label switched packet into the label stack of the label switched packet to be returned to the originating LSP packet switching device. The label switched packet is sent out the intermediate LSP packet switching device on the LSP of the bidirectional LSP towards the originating LSP packet switching device. Processing proceeds to process block 419.

When processing reaches process block 419, processing of the flow diagram of FIG. 4A is complete.

Figure 4B:
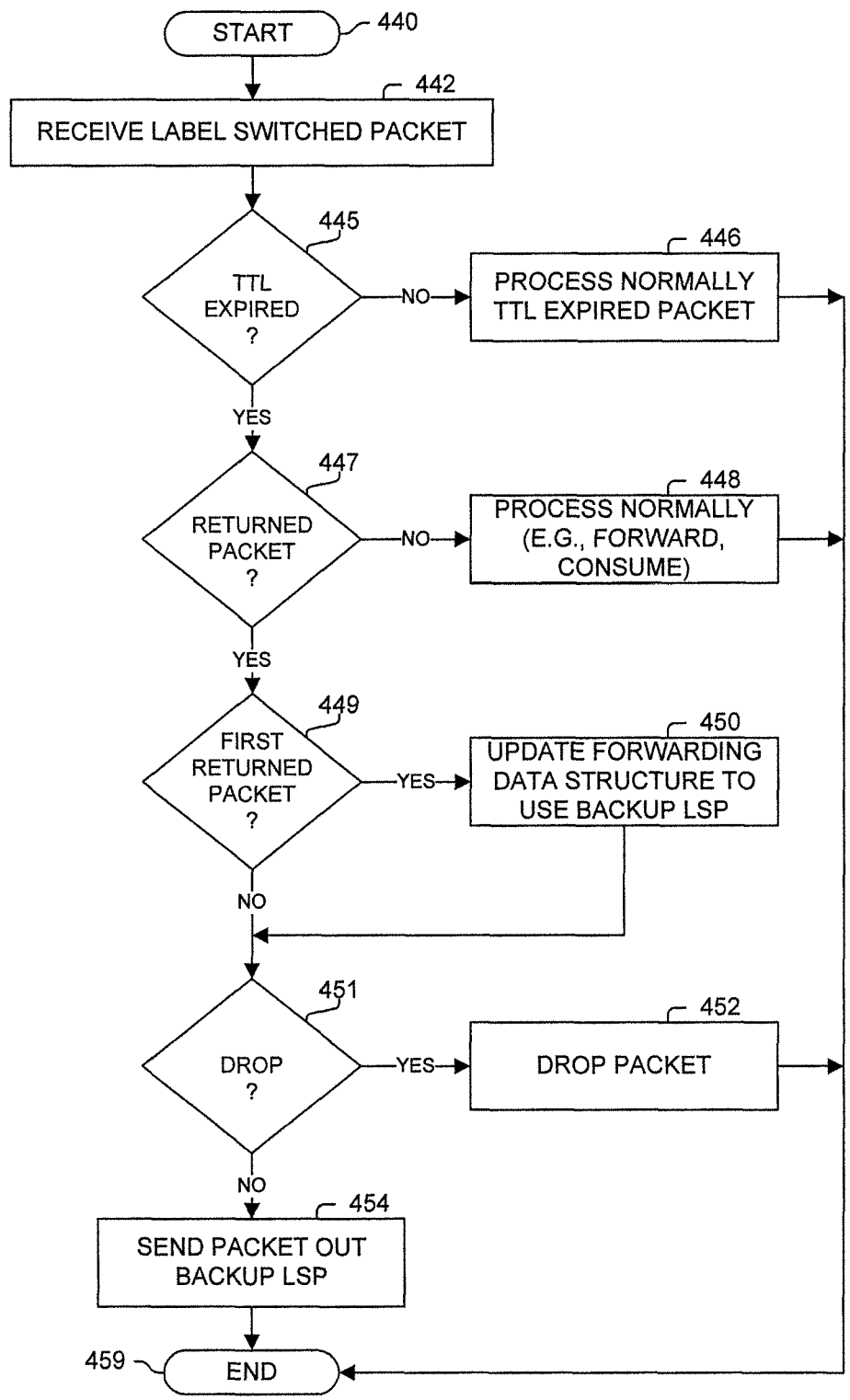
FIG. 4B illustrates a process according to one embodiment.

FIG. 4B illustrates a process performed by an originating LSP packet switching device of one embodiment. Processing begins with process block 440. In process block 442, a label switched packet is received. As determined in process block 445, if the time-to-live (TTL) value of the label switched packet has expired, then in process block 446, normally processing of a label switched packet with an expired TTL is performed. Processing proceeds to process block 459.

Otherwise, as determined in process block 447, if it is not a protection returned label switched packet, then the packet is normally processed (e.g., label stack adjusted and the received label switched packet forwarded) in process block 448. Processing proceeds to process block 459.

Otherwise as determined in process block 449, if the protection returned label switched packet is the first one returned, then in process block 450, the forwarding data structure(s) of the originating packet switching device are updated to use the backup LSP instead of the primary bidirectional LSP (e.g., protection switching is triggered). In one embodiment, the test of process block 451 is updated to drop any subsequently received returned packets and possibly also to drop the first received return packet. In one embodiment, the optimized processing of process block 450 is not performed.

As determined in process block 451, if the protection returned label switched packet is to be dropped (e.g., certain protection returned LSP packets such as, but not limited to, Bidirectional Forwarding Detection (BFD) packets should be dropped, or possibly no packets will be dropped, and possibly the processing of process block 428 may change which packets are dropped, if any), then the label switched packet is dropped in process block 452, else it is sent out on the backup LSP in process block 454. Processing proceeds to process block 459.

When processing reaches process block 459, processing of the flow diagram of FIG. 4B is complete.

Figure 5:
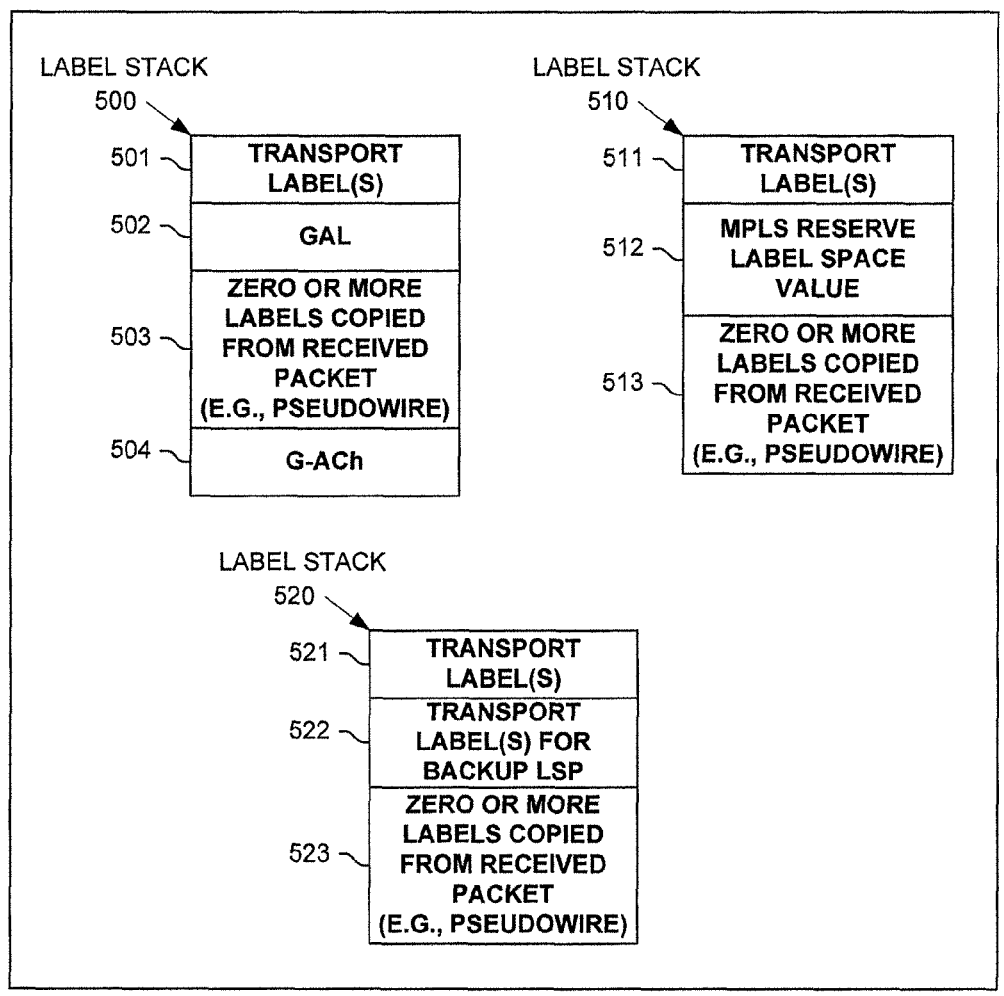
FIG. 5 illustrates select label stack labels according to one embodiment.

FIG. 5 illustrates various label stacks (or portions thereof) of a label switched packet being protection returned by an intermediate LSP packet switching device to the originating LSP packet switching device over an LSP of the bidirectional LSP on which the label switched packet was originally sent by the originating LSP packet switching device in one embodiment. Note, as this protection of a bidirectional label switched path (LSP) can be used in many contexts, different label stacks will be used. Illustrated herein, are just a few of an unlimited number of label stacks of packets sent over a protected bidirectional LSP as discussed herein. Also, transport label(s) 501, 511, and 521 identify labels used in forwarding packets among packet switching devices. Also, in one embodiment, a control word different than a Generic Associated Channel (G-ACh) is used to identify to the originating LSP packet switching device to send the label switched packet over the backup LSP.

In one embodiment, the intermediate LSP packet switching device reversing the direction of the label switched packet modifies the label stack of a return label switched packet to include label stack 500, including: transport labels 501, a Generic Alert Label (GAL) 502, zero or more labels 503 copied from the received label switched packet, such as to provide context for interpreting the information contained in the packet (e.g., one embodiment includes a pseudowire label), and a Generic Associated Channel (G-ACh) 504. In one embodiment, the label stack 500 includes a pseudowire (PW) label 503 interposed between the GAL 502 and the G-ACh 504. In one embodiment, GAL 502, label stack 503 (possibly including a PW label), and G-Ach 504 are in a label stack in a different ordering. In one embodiment, the GAL 502 and G-Ach 504 are used to identify to the originating LSP packet switching device to send the label switched packet over the backup LSP.

In one embodiment, the intermediate LSP packet switching device reversing the direction of the label switched packet modifies the label stack of the label switched packet to include label stack 510 including: transport label(s) 511; a reserved label (e.g., an MPLS reserved label value) 512 to identify to the originating LSP packet switching device to send the label switched packet over the backup LSP; and zero or more labels 513 copied from the received label switched packet, such as to provide context for interpreting the information contained in the packet (e.g., one embodiment includes a pseudowire label).

In one embodiment, the intermediate LSP packet switching device reversing the direction of the label switched packet modifies the label stack of the label switched packet to include label stack 530 including: transport label(s) 521; a label 522 identifying the backup LSP (typically determined by originating LSP packet switching device) to the originating LSP packet switching device, so that the originating LSP packet switching device can directly label switch the packet onto the backup LSP; and zero or more labels 523 copied from the received label switched packet, such as to provide context for interpreting the information contained in the packet (e.g., one embodiment includes a pseudowire label).

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
    sending, by an originating label switched path (LSP) packet switching device, a particular label switched packet to a destination LSP packet switching device over a primary bidirectional LSP, wherein the primary bidirectional LSP is established between the originating LSP packet switching device and the destination LSP packet switching device through an intermediate packet switching device;

receiving, by the intermediate packet switching device, the particular label switched packet;

sending, from the intermediate packet switching device, the particular label switched packet towards the originating LSP packet switching device over the primary bidirectional LSP in response to an error condition identified as affecting the primary bidirectional LSP towards the destination LSP packet switching device;

receiving, by the originating LSP packet switching device, the particular label switched packet said sent from the intermediate packet switching device; and sending, by the originating LSP packet switching device, the particular label switched packet to the destination packet switching device over a backup LSP.

2. The method of claim 1, wherein the primary bidirectional label switched path is a Multiprotocol Label Switching Transport Protocol (MPLS-TP) bidirectional LSP.

3. The method of claim 2, wherein the backup LSP is a second MPLS-TP bidirectional LSP.

4. The method of claim 1, wherein both directions of the primary bidirectional LSP are routed through a same plurality of intermediate packet switching devices, including the intermediate packet switching device.

5. The method of claim 1, wherein the label stack of the particular label switched packet said received by the originating LSP packet switching device includes a Generic Alert Label (GAL) and a Generic Associated Channel (G-ACh) identifying to send the particular label switched packet over the backup LSP after having been initially sent by the originating LSP packet switching device.

6. The method of claim 5, wherein the label stack includes, between the GAL and the G-ACh, one or more labels copied from the particular label switched packet said received by the intermediate packet switching device.

7. The method of claim 6, wherein said one or more labels includes a pseudowire (PW) label.

8. The method of claim 1, wherein the label stack of the particular label switched packet said received by the originating LSP packet switching device includes a reserved label identifying to send the particular label switched packet over the backup LSP after having been initially sent by the originating LSP packet switching device.

9. The method of claim 8, wherein the reserved label is a value in the Multiprotocol Label Switching (MPLS) reserve label space.

10. The method of claim 1, wherein the label stack of the particular label switched packet said received by the originating LSP packet switching device includes a label identifying the backup LSP.

11. The method of claim 1, comprising: sending, from the intermediate packet switching device, the particular label switched packet towards the destination LSP packet switching device over the primary bidirectional LSP when no error condition exists identifying as affecting the primary bidirectional LSP towards the destination LSP packet switching device.

12. The method of claim 1, comprising: updating, by the originating LSP packet switching device in response to said receiving the particular label switched packet said sent from the intermediate packet switching device, to use the backup LSP as a primary LSP for sending packets to the destination LSP packet switching device.

13. The method of claim 12, comprising: dropping, by the originating LSP packet switching device in response to said receiving the particular label switched packet said sent from the intermediate packet switching device, any subsequently received returned LSP packet originally sent to the destination LSP packet switching device over the primary bidirectional LSP and returned to the originating LSP packet switching device.

14. A packet switching device, comprising:
one or more processors;
memory;
a plurality of interfaces, including a first interface configured to receive packets on a first ingress label switched path (LSP) of a first segment of a bidirectional LSP passing through the packet switching device, a second interface configured to send packets on a first egress LSP of the first segment of the bidirectional LSP towards an originating LSP packet switching device, and a third interface configured to send packets on a second egress LSP of a second segment of the bidirectional LSP towards a destination LSP packet switching device; and
one or more packet switching mechanisms configured to packet switch packets among said interfaces according to forwarding information;
wherein said one or more processors are configured to perform operations, including updating said forwarding information comprising to cause label switched packets received on the first ingress LSP to be sent over the second egress LSP, and subsequently to cause particular label switched packets received on the first ingress LSP to be sent over the first egress LSP in response to an error condition identified as affecting at least the second egress LSP of the bidirectional LSP.

15. The packet switching device of claim 14, wherein the packet switching device is configured to modify the label stack of each particular packet of said particular label switched packets to be sent over the first egress LSP to include a Generic Alert Label (GAL) and a Generic Associated Channel (G-ACh) to identify to a packet switching device originally sending said particular packet on the bidirectional LSP to send said particular packet over a backup LSP.

16. The packet switching device of claim 14, wherein the packet switching device is configured to modify the label stack of each particular packet of said particular label switched packets to be sent over the first egress LSP to include a reserved label to identify to a packet switching device originally sending said particular packet on the bidirectional LSP to send said particular packet over a backup LSP.

17. The packet switching device of claim 14, wherein the packet switching device is configured to modify the label stack of each particular packet of said particular label switched packets to be sent over the first egress LSP to include a transport label identifying a backup LSP from a packet switching device originally sending said particular packet.

18. A method, comprising:
sending, by an originating label switched path (LSP) packet switching device, a particular label switched packet to a destination packet switching device over an egress LSP of a primary bidirectional LSP, wherein the primary bidirectional LSP is established between the originating packet switching device and the destination packet switching device;
receiving, by the originating packet switching device on an ingress LSP of the primary bidirectional LSP, the particular label switched packet previously said sent over the egress LSP; and
sending, by the originating packet switching device, the particular label switched packet to the destination packet switching device over a backup LSP.

19. The method of claim 18, wherein the label stack of said received particular label switched packet includes a Generic Alert Label (GAL) and a Generic Associated Channel (G-ACh); and
   wherein the method includes: identifying, by the originating LSP packet switching device to said send the particular label switched packet over the backup LSP based on the GAL and G-ACh.

20. The method of claim 18, wherein the label stack of said received particular label switched packet includes an Multiprotocol Label Switching (MPLS) reserved label; and
   wherein the method includes: identifying, by the originating LSP packet switching device to said send the particular label switched packet over the backup LSP based on the MPLS reserved label.

* * * * *